(12) United States Patent
Molucon et al.

(10) Patent No.: US 11,549,812 B2
(45) Date of Patent: Jan. 10, 2023

(54) COMPACT OPTICAL-FIBRE SAGNAC INTERFEROMETER

(71) Applicant: IXBLUE, Saint-Germain-en-Laye (FR)

(72) Inventors: Cédric Molucon, Saint-Germain-en-Laye (FR); Jérôme Hauden, Besancon (FR)

(73) Assignee: IXBLUE, Saint-Germain-en-Laye (FR)

( * ) Notice: Subject to any disclaimer, the term of this patent is extended or adjusted under 35 U.S.C. 154(b) by 119 days.

(21) Appl. No.: 17/284,316

(22) PCT Filed: Oct. 10, 2019

(86) PCT No.: PCT/FR2019/052408
§ 371 (c)(1),
(2) Date: Apr. 9, 2021

(87) PCT Pub. No.: WO2020/074834
PCT Pub. Date: Apr. 16, 2020

(65) Prior Publication Data
US 2022/0018659 A1 Jan. 20, 2022

(30) Foreign Application Priority Data
Oct. 11, 2018 (FR) .................................... 1859447

(51) Int. Cl.
*G01C 19/72* (2006.01)
(52) U.S. Cl.
CPC ................... *G01C 19/721* (2013.01)
(58) Field of Classification Search
CPC ..... G01C 19/72; G01C 19/721; G01C 19/722
See application file for complete search history.

(56) References Cited

U.S. PATENT DOCUMENTS 5,321,503 A * 6/1994 Bramson .............. G01C 19/726
356/464
6,163,632 A 12/2000 Rickman et al.
(Continued)

FOREIGN PATENT DOCUMENTS

| CN | 112833873 A | * | 5/2021 | |
| CN | 214375657 U | * | 10/2021 | ........... G02F 1/0305 |
| EP | 0483993 A2 | * | 5/1992 | |

OTHER PUBLICATIONS

International Search Report for PCT/FR2019/052408 dated Apr. 24, 2020, 5 pages.
(Continued)

*Primary Examiner* — Michael A Lyons
(74) *Attorney, Agent, or Firm* — Nixon & Vanderhye

(57) ABSTRACT

Disclosed is a Sagnac interferometer with a looped or an in-line optical fiber. The interferometer includes an hybrid integrated optical circuit having at least a first, electro-optic, substrate and a second, transparent, substrate with a common interface, the first substrate including a first optical waveguide, a second optical waveguide, the first optical waveguide and the second optical waveguide being connected to at least one end of the fiber-optic coil, and an input-output optical waveguide connected to a light source and to a detection system, the second substrate including at least one U-shaped optical waveguide and the hybrid integrated optical circuit including a planar waveguide Y-junction with a common branch and two secondary branches.

20 Claims, 3 Drawing Sheets

(56) References Cited

U.S. PATENT DOCUMENTS

Figure 4:
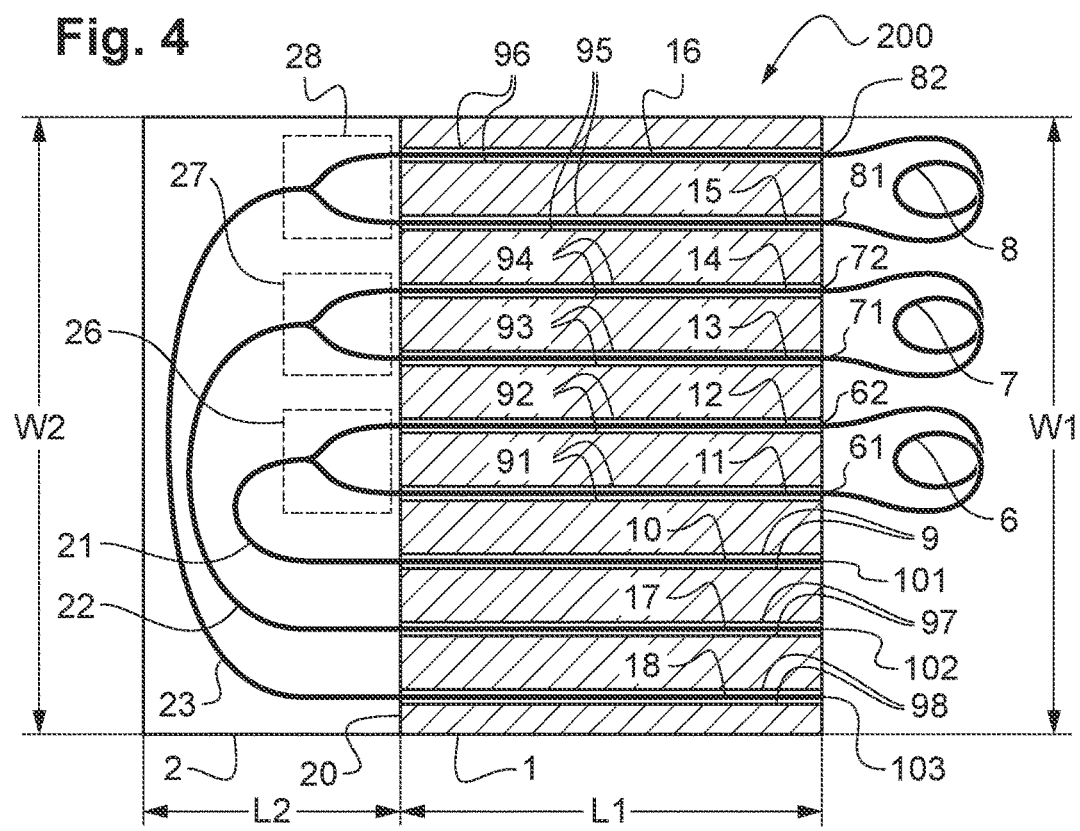

| | | | |
|---|---|---|---|
| 2008/0024786 A1 | 1/2008 | Sanders | |
| 2008/0291459 A1* | 11/2008 | Meyer ................... | G01C 19/721 |
| | | | 356/462 |
| 2019/0101392 A1* | 4/2019 | Bischel ................ | G01C 19/726 |
| 2020/0116489 A1* | 4/2020 | Wang ................. | G02B 6/29302 |

OTHER PUBLICATIONS

Written Opinion of the ISA for PCT/FR2019/052408 dated Apr. 24, 2020, 8 pages.

\* cited by examiner

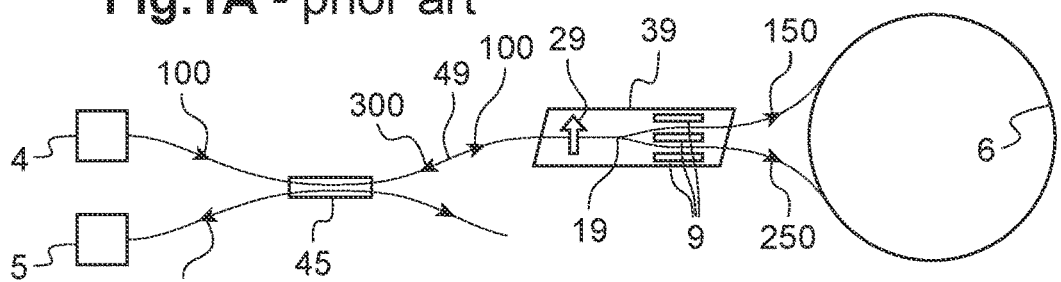
Fig.1A - prior art
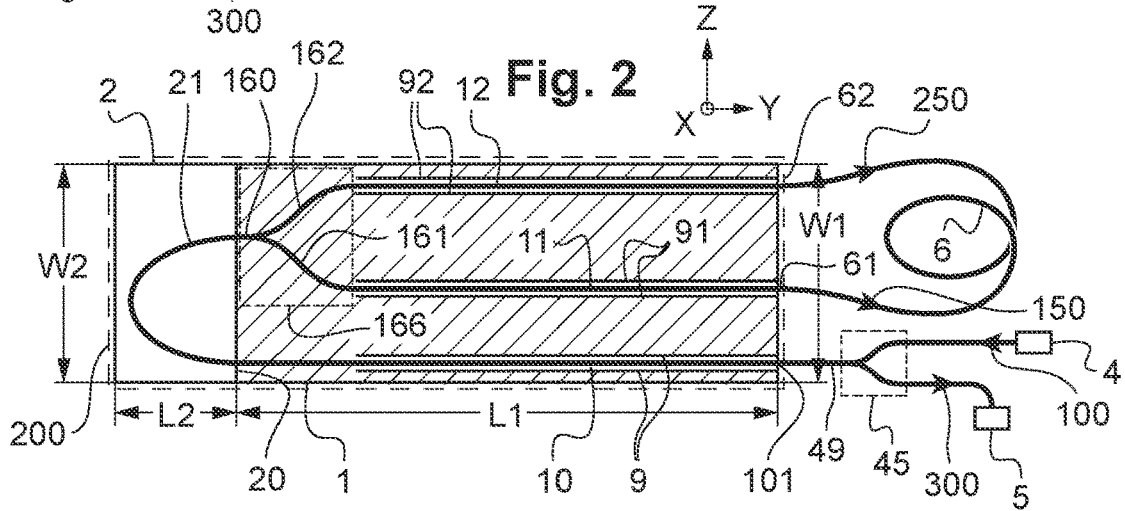
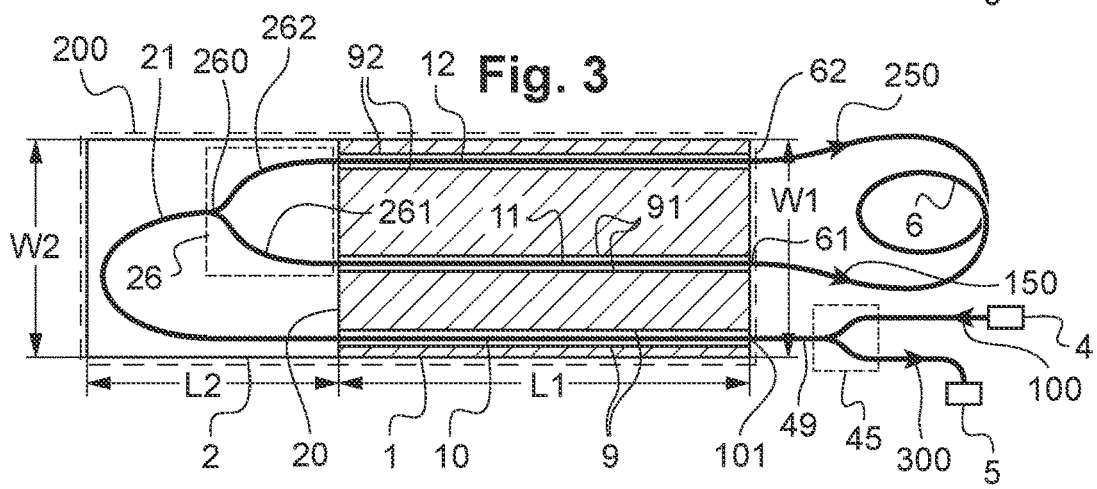
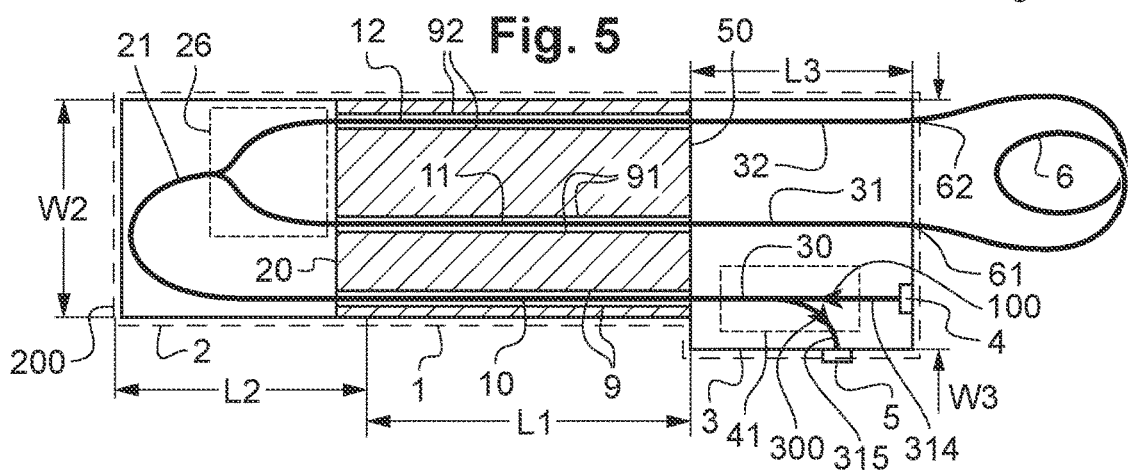

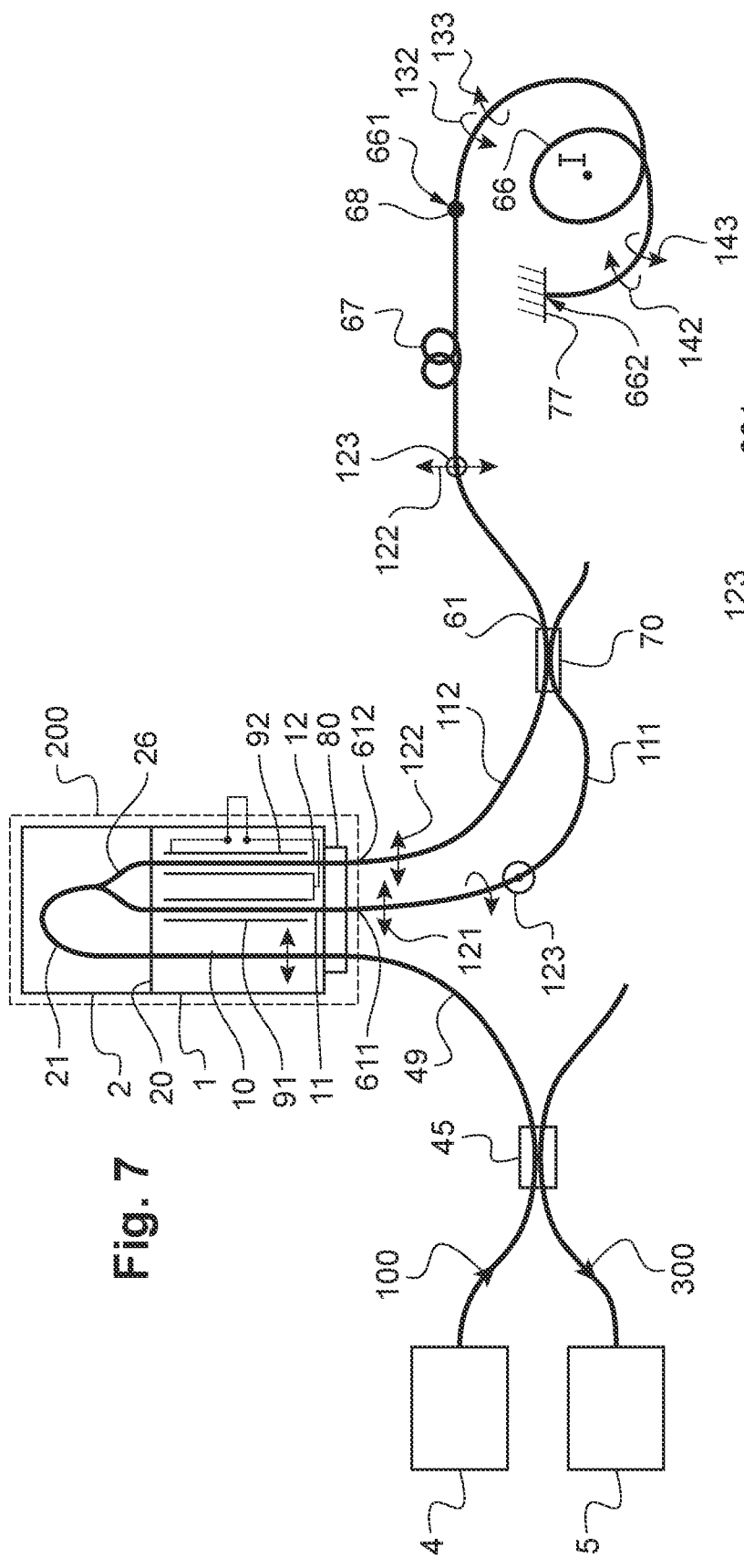
Fig. 7
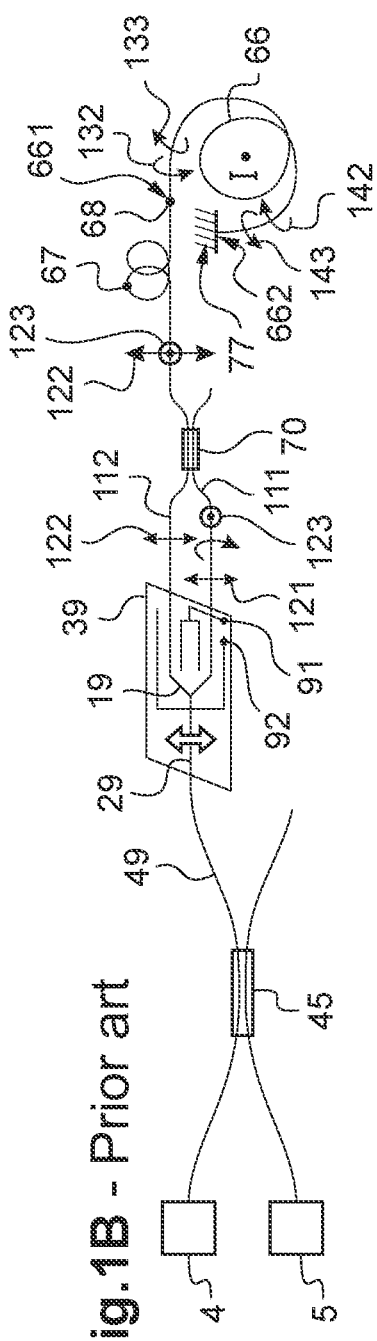
Fig.1B - Prior art

COMPACT OPTICAL-FIBRE SAGNAC INTERFEROMETER

CROSS-REFERENCE TO RELATED APPLICATIONS

This application is the U.S. national phase of International Application No. PCT/FR2019/052408 filed Oct. 10, 2019 which designated the U.S. and claims priority to FR 1859447 filed Oct. 11, 2018, the entire contents of each of which are hereby incorporated by reference.

TECHNICAL FIELD TO WHICH THE INVENTION RELATES

The present invention generally relates to the field of interferometric systems.

It more particularly relates to a looped, or to an in-line, fiber-optic Sagnac interferometric system. Such an interferometric system finds applications in particular in fiber-optic gyroscopes (FOG) or in fiber-optic current sensors (FOCS).

It relates in particular to high-accuracy, compact, lightweight and lower manufacturing cost fiber-optic interferometric system and method.

TECHNOLOGICAL BACK-GROUND

FIG. 1A schematically shows a looped fiber-optic Sagnac interferometric system of the prior art. This fiber-optic interferometric system generally includes a light source 4 emitting a source beam 100, a fiber-optic coil 6, a photodetector 5 and two optical beam splitters: a coil splitter 19 and a source-receiver splitter 45, called the receiver splitter. The coil splitter 19 spatially splits the source beam 100 into a first split beam 150 and a second split beam 250, which propagate in opposite directions in the fiber-optic coil 6. At the coil exit, the coil splitter 19 recombines these two beams to form an interferometric beam 300. The source-receiver splitter 45 guides the interferometric beam 300 to the photodetector 5.

When the interferometric system is at rest, the two split beams emerge from the fiber-optic coil in phase between each other, due to the reciprocity of the optical paths in the fiber-optic coil.

However, in the presence of physical phenomena liable to produce non-reciprocal effects on the optical path of the two counter-propagative beams in the fiber-optic coil 6, a phase difference appears in the detected interferometric beam.

Among the main physical phenomena inducing non-reciprocal effects, the rotation of the interferometric system about the axis of the fiber-optic coil induces a phase difference proportional to the rotation rate. From this property, called the Sagnac effect, ensues the main application of a Sagnac loop interferometer to a gyroscope to measure a rotation rate about the fiber-optic coil axis.

Advantageously, as illustrated in FIG. 1A, a fiber-optic Sagnac interferometric system includes a Multifunction Integrated Optical Circuit (MIOC) 39. The integrated optical circuit 39 comprises optical waveguides preferably formed by proton exchange (APE, Annealed Proton Exchange) on a planar electro-optic substrate, for example made of lithium niobate. The proton exchange on lithium niobate leads to the formation of single-polarization guides and the input waveguide 29 hence forms a single-mode waveguide polarizer that guides only one linear polarization. The integrated optical circuit 39 also comprises a coil splitter 19 of the Y-junction type, formed by splitting of the waveguide 29 into two single-mode secondary branches. Advantageously, the integrated optical circuit 39 also comprises electrodes 9 connected to an electric generator to form an electro-optic modulator adapted to modulate the phase shift between the two counter-propagating beams. The planar substrate of the multifunction integrated optical circuit 39 can be easily connected, on one side, to the two ends of the fiber-optic coil 6 and, on an opposite side, to the source-receiver splitter 45 by a section of optical fiber 49.

A multi-axis fiber-optic gyroscope includes several fiber-optic coils combined with one or several multifunction integrated optical circuits, a same source or several sources and one or several detectors.

Fibre-optic gyroscopes are increasingly used for rotation measurement in guiding or inertial navigation systems, due to their sensitivity, linearity and stability performances.

A fiber-optic gyroscope using one or several fiber-optic coils provides compactness advantages due to the use of optical fibers.

Other physical phenomena, such as the magneto-optic Faraday effect, are also liable to induce non-reciprocal phase differences, and can be measured by means of a looped, or an in-line, fiber-optic Sagnac interferometer, and are used for example in electrical current sensors (J. Blake, P. Tantaswadi, R. T. de Carvalho, "In-line Sagnac interferometer current sensor", IEEE Transactions on power delivery, vol. 11, no. 1, 1996).

By way of example, FIG. 1B schematically shows an in-line fiber-optic Sagnac interferometric system of the prior art. The same reference signs denote elements similar to those of FIG. 1A. The fiber-optic coil 66 is herein formed from a circular polarization-maintaining fiber, using for example the so-called "spun fiber" technology. The fiber-optic coil 66 is wound about an axis on which is located a conductor of electrical current, denoted I. A first end 661 of the fiber-optic coil 66 is connected or attached to a quarter-wave plate 68. The second end 662 of the fiber-optic coil 66 is fastened to a mirror 77. A polarization splitter/combiner 70 receives two beams 122, 123 linearly polarized according to orthogonal polarizations and injects them into a section of linear polarization-maintaining fiber 67. The quarter-wave plate 68 transforms these two linearly polarized beams 122, 123 into a first right circular polarized beam 133 and a second left circular polarized beam 132. The first right circular polarized beam 133 and the second left circular polarized beam 132 propagate in the fiber-optic coil 66 up to the mirror 77, on which they are reflected by exchanging their polarization and respectively form a first left circular polarized beam 143 and a second right circular polarized beam 142. The first left circular polarized beam 143 and the second right circular polarized beam 142 travel through the fiber-optic coil 66 in the opposite direction. Hence, each light beam travels successively through the fiber-optic coil 66 in the two opposite states of circular polarization. The quarter-wave plate 68 transforms the first left circular polarized beam 143 and the second right circular polarized beam 142 into two linearly polarized beams of transverse polarizations. By magneto-optic Faraday effect, the electrical current I aligned on the coil axis induces a phase difference between the circularly polarized beams propagating in the fiber-optic coil 66.

Generally, it is desirable to increase the compactness and/or to reduce the weight and the manufacturing cost of the looped or in-line fiber-optic Sagnac interferometric systems, while keeping their sensitivity, stability and scale factor technical performances.

OBJECT OF THE INVENTION

In order to remedy the above-mentioned drawbacks of the state of the art, the present invention proposes a looped or an in-line fiber-optic Sagnac interferometer comprising a light source, a detection system and at least one fiber-optic coil.

More particularly, it is proposed according to the invention a fiber-optic Sagnac interferometer including a hybrid integrated optical circuit comprising at least one first planar substrate made of an electro-optic material and one second planar substrate made of a material that is transparent to the source wavelength, the first substrate and the second substrate having a common interface between two adjacent sides, the first substrate comprising an input-output optical waveguide connected to the light source and to the detection system, a pair of other optical waveguides comprising a first optical waveguide and a second optical waveguide, the first optical waveguide and the second optical waveguide being connected to at least one end of the fiber-optic coil, an electro-optic modulation system comprising at least one electrode arranged along the first optical waveguide and/or the second optical waveguide, the second substrate comprising at least one U-shaped optical waveguide, the hybrid integrated optical circuit comprising a planar waveguide Y-junction having a common branch and two secondary branches, the first substrate and the second substrate being arranged in such a way that one end of the U-shaped optical waveguide is aligned with one end of the input-output optical waveguide, and that the other end of the U-shaped optical waveguide is aligned with the common branch of the Y-junction, each of the two secondary branches of the Y-junction being aligned with one end of one optical waveguide of the pair of other optical waveguides.

Other non-limitative and advantageous characteristics of the fiber-optic Sagnac interferometer according to the invention, taken individually or according to all the technically possible combinations, are the following:

the Y-junction is formed on the first substrate;

the Y-junction is formed on the second substrate;

the U-shaped optical waveguide exhibits a difference of refractive index with respect to the second substrate of at least 0.05, and preferably between 0.1 and 0.2;

the U-shaped optical waveguide has a radius of curvature smaller than or equal to 1 mm, and preferably lower than or equal to 0.5 mm.

In a particular embodiment, the fiber-optic coil is of the circular polarization-maintaining type, the first end of the fiber-optic coil being connected to a common branch of a polarization splitter coupler via a quarter-wave plate, the second end of the fiber-optic coil being connected to a mirror, the Y-junction of the hybrid integrated circuit forming a beam splitter in the substrate plane, the first optical waveguide being connected to a first secondary branch of the polarization splitter-combiner and the second optical waveguide being connected to a second secondary branch of the polarization splitter-combiner.

In another particular embodiment, the first optical waveguide is connected to a first end of the fiber-optic coil and the second optical waveguide is connected to a second end of the fiber-optic coil.

According to a particular and advantageous embodiment, the interferometer includes N fiber-optic coils, where N is a natural integer higher than or equal to two, the first substrate comprising N input-output optical waveguides, N pairs of other optical waveguides, each waveguide of said N pairs of other optical waveguides being connected to one end of one of the N fiber-optic coils, the electro-optic modulation system comprising at least N electrodes, each of the at least N electrodes being arranged along one waveguide of said N pairs of other optical waveguides, the second substrate comprising N U-shaped optical waveguides, the hybrid integrated optical circuit comprising N planar waveguide Y-junctions, each Y-junction of said N Y-junctions having a common branch and two secondary branches, the first substrate and the second substrate being arranged in such a way that one end of the U-shaped optical waveguide is aligned with one end of one of the N input-output optical waveguides, that the other end of each U-shaped optical waveguide is aligned with the common branch of one of the N Y-junctions, each of the two secondary branches of the N Y-junctions being aligned with one end of one waveguide of said N pairs of other optical waveguides.

Other non-limitative and advantageous characteristics of the fiber-optic Sagnac interferometer according to the invention, taken individually or according to all the technically possible combinations, are the following:

the detection system includes at least one first detector;

the hybrid integrated optical circuit further includes a third planar substrate made of a transparent material, the third substrate and the first substrate having another common interface between two adjacent sides, the third substrate comprising a plurality of optical waveguides, each optical waveguide end of the first substrate on the other interface being connected to one optical waveguide end of the third substrate;

the third substrate integrates the light source and at least one detector;

the detection system includes N detectors;

the interferometer includes N light sources;

the first substrate is formed of a material chosen among lithium niobate, indium phosphide, gallium arsenide and aluminium gallium arsenide;

the second substrate is formed of a material chosen among optical glass, silicon nitride, silicon on insulator and silica on silicon.

DETAILED DESCRIPTION OF AN EXEMPLARY EMBODIMENT

The following description in relation with the appended drawings, given by way of non-limitative examples, will allow a good understanding of what the invention consists of and of how it can be implemented.

Figure 6:
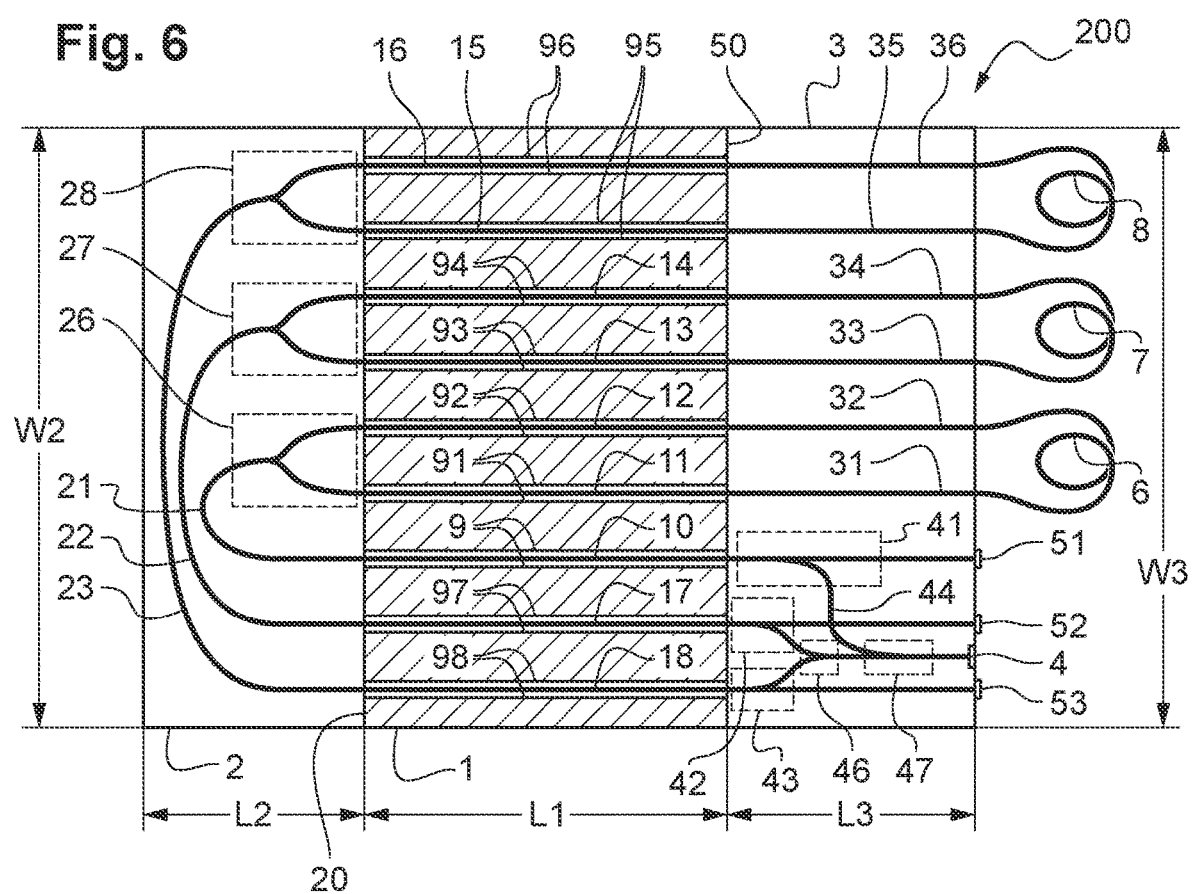

In the appended drawings:

FIG. 1A schematically shows a looped fiber-optic Sagnac interferometric system according to the prior art;

FIG. 1B schematically shows an in-line fiber-optic Sagnac interferometric system according to the prior art;

FIG. 2 schematically shows a looped fiber-optic and hybrid integrated optical circuit Sagnac interferometric system according to a first embodiment;

FIG. 3 schematically shows a looped fiber-optic and hybrid integrated optical circuit Sagnac interferometric system according to a second embodiment;

FIG. 4 schematically shows a three looped fiber-optic coil and one hybrid integrated optical circuit Sagnac interferometric system according to an alternative of the second embodiment;

FIG. 5 schematically shows a looped fiber-optic and hybrid integrated optical circuit Sagnac interferometric system according to a third embodiment;

FIG. 6 schematically shows a three looped fiber-optic coil and one hybrid integrated optical circuit Sagnac interferometric system according to an alternative of the third embodiment;

FIG. 7 schematically shows an in-line fiber-optic Sagnac interferometric system according to a particular embodiment.

A fiber-optic Sagnac interferometric system is considered, which includes a lithium niobate integrated optical circuit formed by proton exchange (APE, Annealed Proton Exchange), as illustrated for example in FIG. 1A. The lithium niobate integrated optical circuit 39 is operable to gather several optical and electro-optic components, hence fulfilling several functions. The input-output waveguide 29 formed by proton exchange is operable to linearly polarize the source beam 100. Moreover, this input-output waveguide 29 also serves as a spatial single-mode filter. In the forward direction, the Y-junction 19 is operable to optically split the source beam 100 into two split incident beams 150, 250. In the reverse direction, the Y-junction 19 is operable to recombine the two split beams having each travelled through the coil in opposite directions, to form the interferential beam. The electrodes 9, arranged along the two secondary branches of the Y-junction, are connected to an electric generator and are operable to electro-optically modulate the phase between split incident beams 150, 250.

Device

The present disclosure proposes a fiber-optic interferometer using a hybrid integrated optical circuit. The hybrid integrated optical circuit combines a first planar electro-optic substrate 1, for example made of lithium niobate, and at least a second planar transparent substrate 2, for example made of an optical glass (for example, of the borosilicate type).

As an alternative, the first substrate 1 is formed of an electro-optic material chosen among indium phosphide (InP), gallium arsenide (AsGa) and aluminium gallium arsenide (AlGaAs). These materials are semi-conductive and make it possible to perform phase modulation.

As an alternative, the second substrate 2 is formed of a material that is transparent to the wavelength used (for example, higher than 0.5 micrometre), chosen among silicon nitride, silicon on insulator (SOI) or silica on silicon.

More particularly, the first substrate 1 and the second substrate 2 are arranged end-to-end and in direct contact through one of their side, also called thickness of the substrates. Advantageously, fastening means are used between the first substrate 1 and the second substrate 2. The fastening means comprise for example a glue and/or a mechanical support or any other suitable fastening means.

The first substrate 1 includes several integrated optical components and/or optical waveguides. The second substrate 2 includes at least one U-shaped optical waveguide to form a planar optical circuit of the PLC ("planar lightwave circuit") type.

In FIG. 2 is shown a looped fiber-optic and hybrid integrated circuit Sagnac interferometric system according to a first embodiment. The interferometric system includes a light source 4, a detection system 5, a fiber-optic coil 6 and a hybrid integrated circuit 200.

The hybrid integrated circuit 200 is herein consisted of a first substrate 1, for example made of lithium niobate, and a second substrate 2, for example made of an optical glass (borosilicate). The interferometric system herein includes only one fiber-optic coil 6.

The first substrate 1 generally has a geometric shape. In the plane of FIG. 2, or YZ-plane in an orthonormal system (XYZ), the first substrate 1 has for example a rectangular shape. Here, the X, Y and Z axes coincide with the crystallographic axes of the lithium niobate first substrate 1: the light propagation axis (along the length of the substrate 1) is the crystallographic Y-axis, the thickness is the crystallographic X-axis and the width is the crystallographic Z-axis. The first substrate 1 is preferably formed from a planar material having a thickness comprised between 0.35 mm and 2 mm, for example of 0.5 mm or 1 mm in the X-axis direction. In a known manner, the sides of the first substrate 1, taken in the thickness, are preferably inclined by an angle with respect to the XZ-plane about the X-axis or the Z-axis, to avoid the spurious back-reflections at the interfaces. The inclination angles at the interfaces are adapted as a function the Snell-Descartes laws.

The first substrate 1 includes a first optical waveguide 11, a second optical waveguide 12 and an input-output optical waveguide 10. The optical waveguides 10, 11, 12 are preferably formed by proton exchange on a lithium niobate substrate. Advantageously, at least a portion of the optical waveguides 10, 11, 12 is arranged parallel in the direction of length L1 of the substrate 1. Two electrodes 91 are arranged on either side along the first optical waveguide 11. Two electrodes 92 are applied on either side along the second optical waveguide 12. In this first embodiment, the first substrate 1 includes a junction 166 of the planar waveguide Y-junction type having a common branch 160, a secondary branch 161 and another secondary branch 162. One end of the first optical waveguide 11 located on one side of the substrate 1 is directly connected to a first end 61 of the fiber-optic coil 6. One end of the second optical waveguide 12 located on the same side of the substrate 1 is directly connected to the second end 62 of the fiber-optic coil 6. The other end of the first optical waveguide 11 is directly connected to the secondary branch 161 of the Y-junction. The other end of the second optical waveguide 12 is directly connected to the other secondary branch 162 of the Y-junction. Preferably, in the APE-formed lithium niobate substrate 1, each branch of the Y-junction has a radius of curvature greater than at least 10 mm. Indeed, in a lithium niobate substrate, the refractive index difference $\Delta n$ between an optical waveguide and the substrate is of the order of 0.005 to 0.01. This small index difference does not allow a good resistance to curvature losses of the optical waveguide. Moreover, an optical waveguide formed by proton exchange on an APE lithium niobate substrate guides only a polarization aligned in the direction of the crystallographic Z-axis.

The input-output optical waveguide 10 is single-mode and forms a waveguide polarizer that guides only one polarization. Advantageously, two electrodes 9 are deposited on either side along the input-output optical waveguide 10. One end of the input-output optical waveguide 10 is connected to one end 101 of an input-output optical fiber 49. The other end of the input-output optical fiber 49 is connected to a source-receiver splitter 45. Hence, the end 101 of the input-output optical fiber 49 is located on the same side of the substrate 1 as the two ends 61, 62 of the fiber-optic coil 6. The ends of the fiber-optic coil 6 and the end 101 of the input-output fiber are for example arranged in a V-shaped support (or V-groove).

The second substrate 2 also generally has a geometric shape. In the plane of FIG. 2, or YZ-plane, the second substrate 2 generally has a rectangular shape. The second substrate 2 is preferably made from a planar material having a thickness between 0.5 mm and 3 mm, for example of about 1 mm in the X-axis direction. Similarly to the substrate 1, the sides of the second substrate 2, taken in the thickness, are preferably inclined by an angle between 0 and 25 degrees with respect to the XZ-plane about the Z-axis or the X-axis, to avoid the spurious reflections at the interface with the first substrate 1. The inclination angles of substrate 1 and substrate 2 at this interface 20 are adapted as a function of the Snell-Descartes laws.

One thickness side of the second substrate 2 is fastened to one thickness side of the first substrate 1 opposite to the side to which are fastened the ends of the optical fiber. The second substrate 2 includes a U-shaped optical waveguide 21. One end of the U-shaped optical waveguide 21 is aligned along X and Z axes with one end of the input-output optical waveguide 10 at the interface 20 between the first substrate 1 and the second substrate 2. The other end of the U-shaped optical waveguide 21 is aligned along the X and Z axes with one end of the common branch 160 of the Y-junction 166 on the same interface 20. The U-shaped optical waveguide 21 is for example formed by silver ion exchange in a sodium (Na)-doped borosilicate glass, then by diffusion under thermal or electrical effect.

The optical waveguides 10, 11, 12 formed by proton exchange in the first substrate generally have an elliptic cross-section. The refractive index of the lithium niobate substrate is of about 2.14 along the extraordinary Z-axis, and of about 2.21 along the ordinary X or Y axes at the wavelength of 1550 nm. The half mode width equivalent to the radius of a Gaussian beam at $1/e^2$ in intensity in the direction parallel to the plane of the first substrate surface is of the order of 4 micrometres. The half mode width equivalent to the radius of a Gaussian beam at $1/e^2$ in intensity in the direction transverse to the plane of the first substrate surface is of the order of 2.5 micrometres. In the second substrate, the U-shaped waveguide has a cross-section adapted as a function of the shape and size of the waveguides of the first substrate. The first substrate 1 and the second substrate 2 are arranged in such a way as to align the ends of the U-shaped waveguide with the ends of the waveguides of the first substrate 1 at the interface 20.

The adjacent sides of the first substrate 1 and the second substrate 2 are transverse to the ends of the U-shaped optical waveguide 21, at the end of the input-output optical waveguide 10 and at the end of the waveguide forming the common branch 160 of the Y-junction. Particularly advantageously, the adjacent sides, contiguous to the first substrate 1 and the second substrate 2 are inclined by an angle between 0 and 25 degrees, for example of 8 degrees with respect to the XZ-plane about the X-axis and/or the Z-axis, so as to limit the spurious back-reflections at the interface 20 between the first substrate 1 and the second substrate 2. For example, the first and/or the second substrates are cut into a parallelogram shape. In another example, the edges of the first and/or the second substrates are cut into an isosceles trapezoidal parallelepiped shape. Advantageously, the two opposite sides in the width direction of the first substrate 1 are inclined with respect to the XZ-plane about the X- and/or Z-axis, so as to avoid the spurious back-reflections in the first substrate 1.

In the second glass substrate 2, the U-shaped optical waveguide 21 may have a radius of curvature smaller than 1 mm and, preferably, smaller than 0.5 mm, while keeping the optical guiding properties, due to the refractive index difference of the order of 0.02 to 0.1 between the core of the waveguide 21 and the substrate 2, for a waveguide having a diameter comprised between 2 and 4 micrometres (μm). As for the first substrate 1, the two opposite sides in the width direction of the second substrate 2 are inclined with respect to the XZ-plane about the X- or Z-axis, so as to avoid the spurious back-reflections in the second substrate 2.

It is observed that all the optical fiber ends 101, 61, 62 are arranged on a same side of the hybrid integrated optical circuit 200. This arrangement makes it possible to limit the total bulk of the component with its connection optical fibers. This arrangement makes it possible to increase the radius of curvature of the ends of the fiber-optic coil 6 and/or of the input-output optical fiber 49. Advantageously, the optical fibers are arranged so as to have a radius of curvature of at least 5 mm, to avoid the curvature losses.

Moreover, the second substrate makes it possible to fold the optical path in the lithium niobate substrate and to limit the length of the hybrid integrated optical circuit 200. In an example, the first substrate 1 has a length L1 of 16 mm, a width W1 of 3 mm and a thickness of 1 mm, the second substrate 2 has a length L2 of 3 mm, a width W2 of 3 mm and a thickness of 1 mm. In total, the hybrid integrated optical circuit has a length of 16+3=19 mm, a width of 3 mm and a thickness of about 1 mm. By comparison, an integrated optical circuit (as illustrated in FIG. 1A), formed only on a lithium niobate substrate 1 integrating in series an input-output waveguide, a Y-junction and two parallel optical waveguides 11, 12 has a total length between 24 mm and 40 mm for a width of 3 mm and a thickness of 1 mm.

The hybrid integrated optical circuit 200 is operable to integrate several optical components on a composite substrate of reduced width. In an exemplary embodiment, the hybrid integrated optical circuit 200 is operable to reduce the length of the integrated optical circuit alone and the bulk of the integrated optical circuit connected to the optical fibers by a factor of about 2. The hybrid integrated optical circuit of FIG. 2 is hence operable to increase the compactness of the fiber-optic interferometric system. Moreover, the use of a hybrid integrated optical circuit also makes it possible to reduce the weight of the fiber-optic interferometric system. In another exemplary embodiment, the hybrid integrated optical circuit 200 is operable to increase the length of the lithium niobate substrate, which makes it possible to lengthen the optical waveguides 11, 12 and the electrodes 91, 92 and hence to lower the modulation voltage applied for a same modulation depth. Finally, the use of a hybrid integrated optical circuit makes it possible to eliminate certain mounting operations and allows an automated manufacturing, hence reducing the manufacturing cost.

The hybrid integrated optical circuit illustrated in FIG. 2 is operable to combine a Y-junction-shaped single-mode waveguide 166 and a U-shaped single-mode optical waveguide 21, one end of the U-shaped single-mode optical waveguide 21 being connected to the common branch 160 of the Y-junction-shaped single-mode waveguide 166.

In the forward direction, the source beam 100 is guided in the input-output optical waveguide 10 then in the U-shaped single-mode optical waveguide 21. The source beam is then transmitted and guided in the common branch 160 of the Y-junction-shaped single-mode waveguide 166. The Y-junction 166 splits the source beam into a first split beam 150 and a second split beam 250. The first split beam 150 propagates in a guided manner in the secondary branch 161 of the Y-junction then in the first optical waveguide 11 to the first end 61 of the fiber-optic coil. Similarly, the second split beam 250 propagates in a guided manner in the other secondary branch 162 of the Y-junction then in the second optical waveguide 12 to the second end 62 of the fiber-optic coil. The first split beam 150 travels through the coil in one direction and exits therefrom via the second end 62 and is guided in the second optical waveguide 12. Reciprocally, the second split beam 250 travels through the coil in the opposite direction and exits therefrom via the first end 61 and is guided in the first optical waveguide 11.

In the reverse direction, each secondary branch 161, 162 of the Y-junction-shaped single-mode waveguide guides a beam having travelled through the fiber-optic coil in mutually opposed directions. The Y-junction 166 recombines these two beams to form an interferential beam. A portion of the interferential beam is guided by the common branch 160 of the Y-junction. However, the waveguide being single-mode, only one mode is guided in the common branch 160 of the Y-junction. By conservation of energy, all the power p of the interferential beam is distributed between a guided beam and a non-guided beam. It is known that an antisymmetric mode propagates in a non-guided manner in the substrate (Arditty et al., "Reciprocity properties of a branching waveguide", Fiber-Optic Rotation Sensors, Springer series in optical sciences, Vol. 32, 1982, pp. 102-110). A portion of this non-guided antisymmetric mode propagates in the first substrate 1 and is refracted at the interface 20 between the first substrate 1 and the second substrate 2 then propagates in a non-guided manner in the second substrate 2. On the contrary, the guided portion of the interferential beam 300 propagates in the U-shaped single-mode optical waveguide 21 then in the input-output optical waveguide 10. In the reverse direction, the optical waveguide 21 forms a spatial filter and the input-output optical waveguide 10 a polarization filter, in other words a polarizer. The combination of the Y-junction and the U-shaped waveguide makes it possible to avoid collecting the non-guided antisymmetric mode of the interferential beam in the input-output waveguide 10 an/or in the input-output optical fiber 49.

In the hybrid integrated optical circuit of FIG. 2, the source beam 100 and the guided interferential beam 300 each perform a passage in the input-output optical waveguide 10. Now, the input-output optical waveguide 10 is polarizing. Moreover, the optical waveguides 11 and 12 are also polarizing. The light beam passes twice in the polarizing input-output optical waveguide 10, once in the optical waveguide 11 and once in the optical waveguide 12, for each counter-propagating beam. Hence, each beam performs four passages in a waveguide polarizer. This quadruple passage in the polarizing lithium niobate optical waveguides 10, 11, 12 is equivalent to a quadruple polarization filtering and hence allows increasing the polarization extinction ratio. This quadruple passage in a polarizing waveguide can allow freeing from an additional polarizer in series with the waveguide polarizer 10 and hence saving the cost of an additional polarizer.

Optionally, the use of electrodes 9 on the input-output optical waveguide 10 makes it possible to modulate the source beam, for example, to blur the source coherence.

In FIG. 3 is shown a looped fiber-optic and hybrid integrated circuit interferometric system according to a second embodiment.

The same reference signs denote elements similar to those of FIG. 2.

The hybrid integrated circuit is also consisted of a first substrate 1, for example made of lithium niobate, and a second substrate 2, for example made of an optical glass (for example, of the borosilicate type). Unlike the first embodiment, the Y-junction is formed on the second substrate and not on the first substrate 1. The first substrate 1 includes a first optical waveguide 11, a second optical waveguide 12 and an input-output optical waveguide 10. The optical waveguides 10, 11, 12 are preferably rectilinear and parallel to each other.

The second substrate 2 includes a U-shaped optical waveguide 21. The second substrate 2 further includes a junction 26 of the planar waveguide Y-junction type, having a common branch 260, a secondary branch 261 and another secondary branch 262. One end of the U-shaped optical waveguide 21 is aligned along the X and Z axes with one end of the input-output optical waveguide 10 at the interface 20 between the first substrate 1 and the second substrate 2. The other end of the U-shaped optical waveguide 21 is connected to one end of the common branch 260 of the Y-junction on the second substrate 2. One end of the secondary branch 261 of the Y-junction on one side of the second substrate 2 is directly connected to one end of the first optical waveguide 11 on an adjacent side of the first substrate 1. Similarly, one end of the secondary branch 162 of the Y-junction on the same side of the second substrate 2 is connected to one end of the second optical waveguide 12 on the adjacent side of the first substrate 1. In other words, the ends of the secondary branches 161, and respectively 162, of the Y-junction on the second substrate are aligned along the X and Z axes with one end of the first, and respectively second, optical waveguide 11, 12, at the interface 20 between the first substrate 1 and the second substrate 2. Advantageously, in the second substrate 2, each branch of the Y-junction can have a radius of curvature smaller than or equal to 1 mm.

Particularly advantageously, the adjacent sides of the first substrate 1 and the second substrate 2 are respectively inclined by a angle defined by the Snell-Descartes laws as a function of the effective index of the guides of the first substrate 1 and respectively second substrate 2. The inclination angles of the sides of the first substrate 1 and the second substrate 2 are comprised between 0 and 25 degrees, for example of about 8 degrees with respect to the XZ-plane about the X- or Z-axis, so as to limit the multiple internal reflections at the interfaces. More precisely, the inclination angles of the first substrate 1 and of the second substrate 2 are adapted as a function of the Snell-Descartes laws. Advantageously, the two opposite sides in the width direction of the second substrate 2 are inclined with respect to the XZ-plane about the X- or Z-axis so as to avoid the multiple spurious internal reflections in the second substrate 2. The assembly of the first substrate 1 and the second substrate 2 is preferably automated in order to reduce the manufacturing costs.

The combination of the Y-junction 26 and the U-shaped optical waveguide 21 with great radiuses of curvature, of the order of 1 mm, makes it possible to strongly attenuate the antisymmetric mode that then propagates in the second substrate 2. The inclination angle at the junction between the second substrate 2 and air makes it possible to further attenuate the spurious couplings of the antisymmetric mode in the input-output waveguide 10 of the first substrate 1.

The hybrid integrated circuit according to the second embodiment filters the antisymmetric mode even more efficiently than the first embodiment.

In an example of this second embodiment, the first lithium niobate substrate 1 has a length L1 of 8 mm, a width W1 of 3 mm and a thickness of 1 mm, the second substrate 2 has a length L2 of 4 mm, a width W2 of 3 mm and a thickness of 1 mm. Hence, the hybrid integrated optical circuit has a total length of 8+4=12 mm, a width of 3 mm and a thickness of about 1 mm. By comparison with the hybrid integrated optical circuit of the first embodiment, this second embodiment makes it possible to further reduce the total length, the weight and the cost of the hybrid integrated optical circuit. The fiber-optic interferometer according to the second embodiment is even more compact than that of the first embodiment.

According to an alternative of the second embodiment, the integrated optical circuit on glass is configured in such a way as to introduce a difference of optical path length between the two secondary branches 261, 262 of the Y-junction 26. Preferably, this length difference is higher than the decoherence length of the light source used. For example, for an erbium source having a spectral width at mid-height of 6.5 nm, this length difference is configured to be higher than 0.6 mm. This length difference makes it possible to avoid the generation of a phenomenon of interferences of the Michelson type between the two ends of the Y-junction in the glass substrate for a gyroscope in which the two paths are not decorrelated.

The fiber-optic interferometric system according to any one of the embodiments can be generalized for an interferometric system with two, three or N fiber-optic coils, where N is a natural integer higher than or equal to 2.

By way of example, FIG. 4 schematically shows a three fiber-optic coil and one hybrid integrated circuit interferometric system according to an alternative of the second embodiment.

The same reference signs denote elements similar to those of FIG. 2 or 3.

The interferometric system includes a first fiber-optic coil 6, a second fiber-optic coil 7, a third fiber-optic coil 8 and a hybrid integrated circuit 200. The hybrid integrated circuit 200 is also consisted of a first substrate 1, for example made of lithium niobate, and a second substrate 2, for example made of an optical glass (borosilicate).

The first substrate 1 includes a first fiber-optic coil 11 and a second fiber-optic coil 12 each having one end connected to one of the ends of the first fiber-optic coil 6. Electrodes 91, respectively 92, are arranged along the first optical waveguide 11 and, respectively second optical waveguide 12. The second substrate 2 includes a first Y-junction 26 and a first U-shaped optical waveguide 21 similar to those described in relation with FIG. 3. The end of the first, respectively second, secondary branch of the Y-junction 26 is connected to another end of the first optical waveguide 11, respectively second optical waveguide 12, at the interface 20 between the first substrate 1 and the second substrate 2. One end of the first U-shaped optical waveguide 21 is connected to the common branch of the Y-junction 26. The first substrate 1 also includes a first input-output waveguide 10. Optionally, electrodes 9 are arranged along the first input-output waveguide 10. The other end of the first U-shaped optical waveguide 21 is connected to an end of the first input-output waveguide 10, at the interface 20 between the first substrate 1 and the second substrate 2. The other end 101 of the first input-output waveguide 10 is connected to a source and a detector, similarly to FIG. 3.

The first substrate 1 further includes a third optical waveguide 13, and respectively a fourth optical waveguide 14, each having one end connected to one of the ends 71, respectively 72, of the second fiber-optic coil 7. Electrodes 93, respectively 94, are arranged along the third optical waveguide 13, and respectively the fourth optical waveguide 14. The second substrate 2 includes a second Y-junction 27 and a second U-shaped optical waveguide 22. The end of the first, respectively second, secondary branch of the second Y-junction 27 is connected to another end of the third optical waveguide 13, respectively the fourth optical waveguide 14, at the interface 20 between the first substrate 1 and the second substrate 2. One end of the second U-shaped optical waveguide 22 is connected to the common branch of the second Y-junction 27. The first substrate 1 further includes a second input-output waveguide 17. Optionally, electrodes 97 are arranged along the second input-output waveguide 17. The other end of the second U-shaped optical waveguide 22 is connected to one end of the second input-output waveguide 17, at the interface 20 between the first substrate 1 or the second substrate 2. The other end 102 of the second input-output waveguide 17 is connected to at least a source and a detector.

Similarly, the first substrate 1 further includes a fifth optical waveguide 15 and a sixth optical waveguide 16 each having one end connected to one of the ends 81, respectively 82, of the third fiber-optic coil 8. Electrodes 95, respectively 96, are arranged along the fifth optical waveguide 15 and, respectively the sixth optical waveguide 16. The second substrate 2 includes a third Y-junction 28 and a third U-shaped optical waveguide 23. The end of the first, respectively second, secondary branch of the third Y-junction 28 is connected to another end of the fifth optical waveguide 15, respectively the sixth optical waveguide 16, at the interface 20 between the first substrate 1 and the second substrate 2. One end of the third U-shaped optical waveguide 23 is connected to the common branch of the third Y-junction 28. The first substrate 1 further includes a third input-output waveguide 18. Optionally, electrodes 98 are arranged along the third input-output waveguide 18. The other end of the third U-shaped optical waveguide 23 is connected to one end of the third input-output waveguide 18, at the interface 20 between the first substrate 1 and the second substrate 2. The other end of the third input-output waveguide 18 is connected to at least one source and one detector.

Advantageously, the optical waveguides 10, 11, 12, 13, 14, 15, 16, 17 and 18 are rectilinear and arranged parallel to each other in the first substrate.

In the example shown, it is observed that the first optical waveguide 21, the second optical waveguide 22 and the third U-shaped optical waveguide 23 are arranged on the second substrate in an interlocked way, without crossing between these waveguides. In an alternative embodiment, the first optical waveguide 21, the second optical waveguide 22 and/or the third optical waveguide 23 can cross each other, preferably at right angle, without interference between the guided beams. For each fiber-optic coil, the combination of a Y-junction and a U-shaped waveguide makes it possible to obtain an efficient filtering of the non-guided antisymmetric modes. This filtering makes it possible to combine the three coils on a same hybrid integrated circuit while avoiding cross-talk disturbances between the signals coming from the different fiber-optic coils.

Advantageously, the interferometric system also includes a light source not shown, a detection system including a first detector connected to the end 101 of the first input-output waveguide 10, a second detector connected to the end 102 of the second input-output waveguide 17 and a third detector connected to the end 103 of the third input-output waveguide 18.

The interferometric system of FIG. 4 can be used for manufacturing an inertial navigation unit, the axes of the three fiber-optic coils being arranged along the axes of a 3D reference system. In an alternative embodiment, the axes of at least two coils are arranged parallel to each other so as to obtain redundant measurements with respect to this axis. The interferometric system of FIG. 4 can be generalized for manufacturing other sensors having N fiber-optic coils, where N is a natural integer higher than or equal to two.

In an exemplary embodiment of the interferometer of FIG. 4, the first substrate 1 has a length L1 of 8 mm, a width W1 of 3 mm and a thickness of 1 mm, the second substrate 2 has a length L2 of 6 mm, a width W2 of 3 mm and a thickness of 1 mm. In total, the hybrid integrated optical circuit has a total length of 8+6=14 mm, a width of 3 mm and a thickness of about 1.2 mm. The use of a hybrid integrated optical circuit makes it possible to significantly increase the compactness of an interferometric system having several fiber-optic coils, while reducing the total weight. Finally, the use of multi-coil hybrid integrated optical circuit makes it possible to eliminate certain mounting operations and allows an automated manufacturing, hence reducing the manufacturing cost.

In FIG. 5 is shown a looped fiber-optic and hybrid integrated circuit interferometric system according to a third embodiment.

The same reference signs denote elements similar to those of FIG. 3.

The hybrid integrated circuit 200 is herein consisted of a first substrate 1, for example made of lithium niobate, a second substrate 2 and a third substrate 3. The second substrate 2 and the third substrate 3 are for example made of an optical glass (borosilicate). As an alternative, the second substrate 2 and/or the third substrate 3 is formed of a material chosen among silicon nitride or silicon on insulator (SOI) or silica on silicon.

The third substrate 3 also generally has a geometric shape. In the plane of FIG. 2, or XY-plane, the third substrate 3 generally has a rectangular shape. The third substrate 3 is preferably made from a planar material having a thickness comprised between 0.5 mm and 3 mm, for example about 1 mm in the X-axis direction. The sides of the third substrate 3, taken in the thickness, are preferably inclined by an angle between 0 and 25 degrees, for example of 8 degrees, with respect to the XZ-plane about the X- or Z-axis to avoid the spurious reflections at the interface. The inclination angles of the third substrate 3 are adapted as a function of the Snell-Descartes laws.

The first substrate 1 and the second substrate 2 are fastened to each other through an adjacent side, forming an interface 20, similarly to the system illustrated in FIG. 3. The third substrate 3 is fastened to the first substrate 1 through another side, opposite to the first side, forming another interface 50.

More precisely, the third substrate 3 includes a first optical waveguide 31 and a second optical waveguide 32, for example rectilinear. One end of the first optical waveguide 31 of the third substrate 3 is connected to one end of the first optical waveguide 11 at the interface 50 between the first substrate 1 and the third substrate 3. The other end of the first optical waveguide 31 of the third substrate 3 is connected to a first end 61 of the fiber-optic coil 6. One end of the second optical waveguide 32 of the third substrate 3 is connected to one end of the second optical waveguide 12 at the interface 50 between the first substrate 1 and the third substrate 3. The other end of the second optical waveguide 32 of the third substrate 3 is connected to the second end 62 of the fiber-optic coil 6. In other words, the ends of the optical waveguide 10, respectively 11 and 12, of the first substrate 1 are aligned, along the X and Z axes, with the ends of the optical waveguide 30, respectively 31, 32, of the third substrate 3.

Advantageously, the ends of the optical waveguides 31, 32 intended to be connected to the ends of the optical fiber are adapted as a function of the sizes of a single-mode beam on the one hand in the optical fiber 6 and, on the other hand, in the optical waveguides of the first substrate 1. For example, the optical waveguides 31, 32 have a conical shape having, at one end, a diameter adapted to the fiber core (of the order of 5 to 10 micrometres of diameter, for example) and, at the other end, a diameter adapted to the waveguide formed by proton exchange on the first substrate (of the order of 3 to 8 micrometres of diameter, for example).

The third substrate 3 includes a planar optical waveguide Y-junction coupler 41. The Y-junction coupler 41 forms a source-receiver splitter. The Y-junction coupler 41 includes a common branch 30, a secondary branch 314 and another secondary branch 315. The common branch 30 is connected to the end of the input-output optical waveguide 10 at the interface 50 between the first substrate 1 and the third substrate 3. A source 4 is fastened on one side of the third substrate. As an alternative, the source 4 is stuck above or below the third substrate 3 and combined with a 45-degree deflection mirror. The source 4 is chosen among a light-emitting diode (LED), a super-luminescent light-emitting diode (SLED), a distributed feedback (DFB) laser or an amplified spontaneous emission (ASE) source with a rare earth (in particular, erbium) doped fiber. The source 4 can be directly fastened on the substrate 3 or connected by an optical fiber to the end of the secondary branch 314. The source 4 generates the source beam 100. A detector 5 is fastened, for example, on another side of the third substrate. In an alternative embodiment, the detector 5 is fastened on the same side as the source 4 and the fiber-optic coil 6. In an alternative embodiment, the detector 5 is fastened above or below the third substrate 3 and combined with a 45-degree deflection mirror. The source-receiver splitter 41 guides the interferometric beam 300 to the photosensor 5. The detector 5 is preferably a photodiode.

In an exemplary embodiment of the hybrid integrated circuit illustrated in FIG. 5, the first substrate 1 has a length L1 of 8 mm, a width W1 of 3 mm and a thickness of 1 mm, the second substrate 2 has a length L2 of 4 mm, a width W2 of 3 mm and a thickness of 1 mm, and the third substrate 3 has a length L3 of 4 mm, a width W3 of 3 mm and a thickness of 1 mm. In total, the hybrid integrated optical circuit has a total length of 8+4+4=16 mm, a width of 3 mm and a thickness of about 1 mm. The integration of the source and the detector on the hybrid integrated optical circuit makes it possible to further increase the compactness of the interferometric system. The hybrid integrated circuit consisted of 3 substrates fastened to each other can be automatically assembled, in an active or passive way, which hence reduces the manufacturing cost.

The fiber-optic interferometric system according to the third embodiment can be generalized for a two, three or N fiber-optic coil interferometric system, where N is a natural integer higher than or equal to 2.

By way of example, FIG. 6 schematically shows a three looped fiber-optic coil and a hybrid integrated circuit interferometric system according to an alternative of the third embodiment.

The same reference signs denote elements similar to those of FIG. 4 or 5, in particular as regards the integrated optical elements on the first substrate 1 and on the second substrate 2. The second substrate 2 hence includes three Y-junctions 26, 27 and 28 each connected to a U-shaped optical waveguide 21, respectively 22 and 23.

In FIG. 6, the third substrate 3 includes three pairs of optical waveguides 31-32, respectively 33-34 and 35-36, connected to the ends of the first fiber-optic coil 6, respectively second fiber-optic coil 7 and third fiber-optic coil 8. A source 4 is fastened or integrated on the third substrate 3. In the example of FIG. 6, the source 4 is fastened on the side of the third substrate where the fiber-optic coils are connected. A first detector 51, respectively second detector 52 and third detector 53, is fastened to the third substrate 3. The third substrate 3 also includes a first waveguide source-receiver splitter coupler 41 having a secondary branch connected to the source 4, another secondary branch connected to the first detector 51 and a common branch connected to the end of the first input-output optical waveguide 10 at the interface 50 between the first substrate 1 and the third substrate 3. Similarly, the third substrate 3 also includes a second waveguide source-receiver splitter coupler 42 having a secondary branch connected to the source 4, another secondary branch connected to the second detector 52 and a common branch connected to the end of the second input-output optical waveguide 17 at the interface 50 between the first substrate 1 and the third substrate 3. Finally, the third substrate 3 also includes a third waveguide source-receiver splitter coupler 43 having a secondary branch connected to the source 4, another secondary branch connected to the third detector 53 and a common branch connected to the end of the third input-output optical waveguide 18 at the interface 50 between the first substrate 1 and the third substrate 3. The first, respectively second and third source-receiver splitter coupler 41, respectively 42 and 43, are preferably evenly power distributed 1-by-2 couplers (denoted 1*2), also called 50%-50% couplers.

Advantageously, the third substrate 3 further includes two Y-junction couplers 46, 47 arranged in series to combine into a single branch connected to the source 4 the secondary branches of the first, second an third source-receiver splitter couplers 41, 42 and 43. The Y-junction coupler 46 is preferably an evenly power distributed 1*2 coupler, or 50%-50% coupler. The Y-junction coupler 47 is preferably a 1-by-2 coupler of the 33%-66% coupler type, so that the maximum power of the signal coming from each coil is of same level.

As illustrated in FIG. 6, two optical waveguides cross each other perpendicularly at point 44 on the third integrated optical circuit. However, in single-mode optical waveguides, a 90-degree crossing induces no optical communication or disturbance between the two transverse waveguides.

In an exemplary embodiment of hybrid integrated circuit illustrated in FIG. 6, the first lithium niobate substrate 1 has a length L1 of 8 mm, a width W1 of 3 mm and a thickness of 1 mm, the second glass ($SiO_2$) substrate 2 has a length L2 of 6 mm, a width W2 of 3 mm and a thickness of 1.2 mm, and the third substrate 3 has a length L3 of 6 mm, a width W3 of 3 mm and a thickness of 1.2 mm. In total, the hybrid integrated optical circuit has a total length of 8+6+6=20 mm, a width of 3 mm and a thickness of about 1.2 mm. The integration of the source 4 and the three detectors 51, 52, 53 on the hybrid integrated optical circuit makes it possible to further increase the compactness and to reduce the weight of the interferometric system. The hybrid integrated circuit consisted of 3 substrates fastened to each other can be automatically assembled, in an active or passive way, which hence reduces the manufacturing cost.

FIG. 7 schematically shows an in-line fiber-optic Sagnac interferometric system according to another embodiment of the present disclosure. The in-line fiber-optic interferometric system of FIG. 7 finds applications such an electric current sensor.

The same reference signs denote elements similar to those of FIGS. 1B and 3. The system includes a source 4, a detector 5, a source-receiver splitter 45 and a hybrid integrated optical circuit 200. A hybrid integrated optical circuit 200 similar to that of FIG. 3 replaces the integrated optical circuit 39 of FIG. 1B. In the example shown, the hybrid integrated optical circuit 200 includes a first substrate 1 made of lithium niobate and a second substrate 2 made of optical glass (for example, borosilicate). The first substrate 1 herein also includes an input-output optical waveguide 10, a first waveguide 11 provided with electrodes 91 and a second waveguide 12 provided with electrodes 92. The second substrate 2 includes a U-shaped optical waveguide 21 connected to the common branch of a waveguide Y-junction 26.

The source-receiver splitter 45 is connected by an optical fiber 49 to the hybrid integrated optical circuit 200. More precisely, the optical fiber 49 is connected to one end of the input-output waveguide 10 on the first substrate 1. The optical fiber 49 is a non-polarizing fiber. As an alternative, the optical fiber 49 is polarizing and aligned with the polarizer consisted by the lithium niobate substrate 1.

The hybrid integrated circuit 200 receives a source beam 100 on the single-mode input-output waveguide 10. The input-output waveguide 10 polarizes linearly the source beam. The U-shaped optical waveguide 21 is a spatially single-mode filter that filters additionally the source beam in order to make it even more spatially single-mode. The second substrate 2 includes a waveguide Y-junction 26. The Y-junction 26 receives the guided source beam at one end of the U-shaped optical waveguide 21 and splits it into a first linearly polarized secondary beam 121 propagating along a secondary branch 261 of the Y-junction 26 and a second linearly polarized secondary beam 122 propagating along another secondary branch 262 of the Y-junction 26. The end of the secondary branch 261, respectively of the other secondary branch 262, is connected to one end of the first waveguide 11, respectively of the second waveguide 12, at the interface 20 between the first substrate 1 and the second substrate 2. The first linearly polarized secondary beam 121 propagates in the first waveguide 11. And the second linearly polarized secondary beam 122 propagates in the second waveguide 12. Electrodes 91 and 92 are arranged along the first waveguide 11 and the second waveguide 12, respectively.

On the side of the first substrate 1 opposed to the interface 20 with the second substrate 2, the end of the first optical waveguide 11 is connected to a section of optical fiber 111. The section of optical fiber 111 is of the polarization maintaining type. In the example illustrated in FIG. 7, two sections of polarization-maintaining optical fiber 111 are used, which are welded end-to-end with a 90-degree weld between the polarization axes of the two sections of optical fiber, so as to rotate the polarization axis by 90 degrees. As an alternative, the sections of optical fiber 111 and 112 are arranged differently on the substrate 1 at the time of sticking, one being aligned with the fast axis and the other with the slow axis of the PM fiber axes. As an alternative, the first linearly polarized light beam 121 propagates in the section of optical fiber 111 that is placed in torsion to rotate its polarization axis by 90 degrees and that hence transforms it into another linearly polarized light beam 123, but at 90 degrees from the beam 121.

On the side of the first substrate 1 opposed to the interface 20 with the second substrate 2, the end of the second optical waveguide 12 is connected to another section of polarization-maintaining optical fiber 112. Preferably, the ends of the sections of optical fiber 111 and 112 are arranged in a V-shaped support (or V-groove) 80. The second linearly polarized light beam 122 propagates in the other section of optical fiber 112 by keeping its polarization direction. Hence, the second linearly polarized beam 122 is directed at 90 degrees from the other linearly polarized beam 123.

The polarization splitter-combiner 70 combines the second linearly polarized beam 122 and the other linearly polarized light beam 123 and injects them into the section of linear polarization-maintaining fiber 67.

The respectively right circular polarized beam 133 and left circular polarized beam 132 propagate in the forward direction of the fiber-optic coil 66 and are then reflected on the mirror 77, where the polarizations of the beams are inverted. Then, the right circular polarized beam 142 and the left circular polarized beam 143 propagate in the reverse direction of the fiber-optic coil 66 and are transformed by the quarter-wave plate 68 into two linearly polarized beams of transverse polarizations. The polarization splitter-combiner 70 splits the two transverse linear polarization states and directs one of them to the first optical waveguide 11 and the other to the second optical waveguide 12. The Y-junction 26 recombines the two beams each having travelled through the coil with the two crossed circular polarizations and forms an interferential beam 300, which propagates in the U-shaped optical waveguide 21, the input-output waveguide 10, then the optical fiber 49 to the detector 5.

In this in-line Sagnac interferometer, the combination of the first lithium niobate substrate and the second glass substrate, the first substrate 1 comprising a polarizing single-mode input-output waveguide 10, and waveguides 11, 12 provided with electrodes, the second substrate comprising a single-mode U-shaped optical waveguide 21 and further, herein, a Y-junction forming a splitter for the beam guided in the U-shaped optical waveguide 21. The integration of the components indicated hereinabove in a hybrid integrated circuit makes it possible to reduce the bulk of the in-line Sagnac interferometric system, while allowing a single-mode and polarization filtering of the source beam and of the interferometric beam and a birefringence modulation of the beams travelling through the fiber-optic coil. All the ends of the optical fiber are arranged on a same side of the hybrid integrated circuit 200. Advantageously, these ends of the optical fiber are arranged in a V-shaped support (or V-groove) 80 fastened on one side of the hybrid integrated circuit. The V-shaped support 80 is little bulk and improves the positioning of the optical fibers with respect to the optical waveguides of the hybrid integrated circuit 200.

Method

The present disclosure also proposes an interferometric measurement method, for a looped or in-line fiber-optic interferometer, comprising the following steps:

emitting a source beam 100;

using a hybrid integrated circuit as described according to one of the embodiments mentioned hereinabove to inject the source beam 100 into at least one polarizing input-output optical waveguide 10 of the first substrate 1;

guiding and single-mode filtering the source beam in the U-shaped optical waveguide 21 of the second substrate 2;

transmitting the source beam from the U-shaped optical waveguide 21 to the common branch of a planar waveguide Y-junction 26;

splitting the source beam into a first and a second secondary beam guided in the secondary branches of the Y-junction 26;

transmitting the first, respectively second, secondary beam from the first, respectively second, secondary branch of the Y-junction to a first, respectively second, optical waveguide of the first substrate 1;

transmitting the first, respectively second, secondary beam from the first, respectively second, secondary branch of the Y-junction to at least one end of the fiber-optic coil;

receiving the two secondary beams after propagation in the fiber-optic coil on the first, respectively second, optical waveguide of the first substrate 1;

forming an interferometric beam in the Y-junction 26;

guiding and single-mode filtering the interferometric beam in the U-shaped optical waveguide 21 of the second substrate 2;

detecting the interferometric beam.

The method makes it possible to combine several functions: single-mode and polarization filtering, splitting and recombination of the light beam, phase modulation by means of a single planar hybrid integrated circuit, of small bulk, low weight and reduced manufacturing cost.

The invention claimed is:

1. A looped or in-line fiber-optic Sagnac interferometer comprising a light source, a detection system and at least one fiber-optic coil,
   wherein said interferometer includes:
   a hybrid integrated optical circuit comprising at least a first planar substrate made of an electro-optic material and a second planar substrate made of a transparent material, the first substrate and the second substrate having a common interface between two adjacent sides,
   the first substrate comprising an input-output optical waveguide connected to the light source and to the detection system, a pair of other optical waveguides comprising a first optical waveguide and a second optical waveguide, the first optical waveguide and the second optical waveguide being connected to at least one end of the fiber-optic coil, an electro-optic modulation system comprising at least one electrode arranged along the first optical waveguide and/or the second optical waveguide;
   the second substrate comprising at least one U-shaped optical waveguide;
   the hybrid integrated optical circuit comprising a planar waveguide Y-junction having a common branch, two secondary branches,
   the first substrate and the second substrate being arranged in such a way that one end of the U-shaped optical waveguide is aligned with one end of the input-output optical waveguide, and that the other end of the U-shaped optical waveguide is aligned with the common branch of the Y-junction, each of the two secondary branches of the Y-junction being respectively aligned with one end of one optical waveguide of the pair of other optical waveguides.

2. The fiber-optic Sagnac interferometer according to claim 1, wherein the Y-junction is formed on the first substrate.

3. The fiber-optic Sagnac interferometer according to claim 1, wherein the Y-junction is formed on the second substrate.

4. The fiber-optic Sagnac interferometer according claim 1, wherein the U-shaped optical waveguide exhibits a difference of refractive index with the second substrate of at least 0.05.

5. The fiber-optic Sagnac interferometer according to claim 4, wherein the U-shaped optical waveguide has a radius of curvature smaller than or equal to 1 mm.

6. The fiber-optic Sagnac interferometer according to claim 1, wherein the U-shaped optical waveguide has a radius of curvature smaller than or equal to 1 mm.

7. The looped fiber-optic Sagnac interferometer according to claim 1, wherein the first optical waveguide is connected to a first end of the fiber-optic coil and the second optical waveguide is connected to a second end of the fiber-optic coil.

8. The fiber-optic Sagnac interferometer according to claim 7, wherein the hybrid integrated optical circuit further includes a third planar substrate made of a transparent material, the third substrate and the first substrate having another common interface between two adjacent sides, the third substrate comprising a plurality of optical waveguides, each end of the optical waveguide of the first substrate on the other interface being connected to one end of optical waveguide of the third substrate.

9. The looped fiber-optic Sagnac interferometer according to claim 1, including N fiber-optic coils, where N is a natural integer higher than or equal to two, the first substrate comprising N input-output optical waveguides, N pairs of other optical waveguides, each waveguide of said N pairs of other optical waveguides being connected to one distinct end of one of the N fiber-optic coils, the electro-optic modulation system comprising at least N electrodes, each of the at least N electrodes being arranged along one waveguide of said N pairs of other optical waveguides;
- the second substrate comprising N U-shaped optical waveguides;
- the hybrid integrated optical circuit comprising N planar waveguide Y-junctions, each Y-junction of said N Y-junctions having a common branch and two secondary branches;
- the first substrate and the second substrate being arranged in such a way that one end of each U-shaped optical waveguide is aligned with one end of one of the N input-output optical waveguides, the other end of each U-shaped optical waveguide is aligned with the common branch of one of the N Y-junctions, each of the two secondary branches of the N Y-junctions being aligned with one end of one waveguide of said N pairs of other optical waveguides.

10. The fiber-optic Sagnac interferometer according to claim 9, wherein the hybrid integrated optical circuit further includes a third planar substrate made of a transparent material, the third substrate and the first substrate having another common interface between two adjacent sides, the third substrate comprising a plurality of optical waveguides, each end of the optical waveguide of the first substrate on the other interface being connected to one end of optical waveguide of the third substrate.

11. The fiber-optic Sagnac interferometer according to claim 9, wherein the first substrate is formed of a material chosen among lithium niobate, indium phosphide, gallium arsenide and aluminium gallium arsenide.

12. The fiber-optic Sagnac interferometer according to claim 9, wherein the second substrate is formed of a material chosen among optical glass, silicon nitride, silicon on insulator and silica on silicon.

13. The fiber-optic Sagnac interferometer according to claim 1, wherein the hybrid integrated optical circuit further includes a third planar substrate made of a transparent material, the third substrate and the first substrate having another common interface between two adjacent sides, the third substrate comprising a plurality of optical waveguides, each end of the optical waveguide of the first substrate on the other interface being connected to one end of optical waveguide of the third substrate.

14. The fiber-optic Sagnac interferometer according to claim 13, wherein the third substrate integrates the light source, and at least one detector.

15. The fiber-optic Sagnac interferometer according to claim 14, wherein:
- the detection system includes N detectors, where N is a natural integer higher than or equal to two.

16. The fiber-optic Sagnac interferometer according to claim 15, including N light sources, where N is a natural integer greater than or equal to two.

17. The fiber-optic Sagnac interferometer according to claim 14, including N light sources, where N is a natural integer higher than or equal to two.

18. The fiber-optic Sagnac interferometer according to claim 13, including N light sources, where N is a natural integer higher than or equal to two.

19. The fiber-optic Sagnac interferometer according to claim 1, wherein the first substrate is formed of a material chosen among lithium niobate, indium phosphide, gallium arsenide and aluminium gallium arsenide.

20. The fiber-optic Sagnac interferometer according to claim 1, wherein the second substrate is formed of a material chosen among optical glass, silicon nitride, silicon on insulator and silica on silicon.

* * * * *